United States Patent [19]

Taaffe

[11] Patent Number: 4,747,139
[45] Date of Patent: May 24, 1988

[54] SOFTWARE SECURITY METHOD AND SYSTEMS

[76] Inventor: James L. Taaffe, 74 Appleton St., Arlington, Mass. 02174

[21] Appl. No.: 921,851

[22] Filed: Oct. 21, 1986

Related U.S. Application Data

[63] Continuation of Ser. No. 644,556, Aug. 27, 1984, abandoned, and a continuation-in-part of Ser. No. 644,555, Aug. 27, 1984, and Ser. No. 644,800, Aug. 27, 1984.

[51] Int. Cl.$^4$ ............................................. H04L 9/00
[52] U.S. Cl. ........................................ 380/44; 380/4; 380/46
[58] Field of Search .............................. 380/4, 43–48

[56] References Cited

U.S. PATENT DOCUMENTS

| | | | |
|---|---|---|---|
| 3,711,645 | 1/1973 | Ehrat | 380/47 |
| 3,808,365 | 4/1974 | Ehrat | 178/22.16 |
| 4,115,657 | 9/1978 | Morgan | 178/22.16 |
| 4,120,030 | 10/1978 | Johnstone | 380/4 |
| 4,225,935 | 9/1980 | Zscheile et al. | 178/22.15 |
| 4,278,837 | 7/1981 | Best | 380/4 |
| 4,319,079 | 3/1982 | Best | 178/22.09 |
| 4,352,952 | 10/1982 | Boone et al. | 178/22.09 |
| 4,408,093 | 10/1983 | Place | 178/22.09 |
| 4,433,207 | 2/1984 | Best | 178/22.09 |
| 4,471,163 | 9/1984 | Donald et al. | 178/22.08 |
| 4,484,025 | 11/1984 | Ostermann et al. | 380/48 |
| 4,484,027 | 11/1984 | Lee et al. | 380/46 |
| 4,488,001 | 12/1984 | Cooley et al. | 380/4 |

OTHER PUBLICATIONS

Huston, W., "New ICs Help Prevent Software Theft".

Primary Examiner—Salvatore Cangialosi
Attorney, Agent, or Firm—Hamilton, Brook, Smith & Reynolds

[57] ABSTRACT

Encrypted digital information in a data processing system is decrypted using a key which is a word sequence. The key is generated in a hardware module which is a single chip microprocessor. Individual words of the key word sequence generated by the module are generated as a function of a plurality of words of the input key word sequence. To that end, the microprocessor is programmed as a finite state machine. The hardware module may be combined with a storage medium in a software package. The decryption routines and a key sequence to be applied to the key generator are stored with the application software on the storage medium. To decrypt the application software, the stored key sequence is applied to the key generator to obtain an output key sequence. A computer system may include an encryption/decryption module and a key generator module to encrypt software and data prior to outputting the software or data from the system. Identical key generators may be utilized for encryption and decryption in a secure network.

4 Claims, 5 Drawing Sheets

SOFTWARE SECURITY METHOD AND SYSTEMS

This is a continuation of copending application Ser. No. 644,556 filed on Aug. 27, 1984, now abandoned, and a continuation-in-part of copending application Ser. No. 644,555 filed Aug. 27, 1984, and of Ser. No. 644,800 filed Aug. 27, 1984.

DESCRIPTION

1. Field of the Invention

The present invention relates to a method and related systems for protecting software from unauthorized copying and unauthorized access.

2. Background

There exists a strong desire to prevent the unlawful use of computer software and its associated data. Unlawful use takes many forms. One example is the unauthorized copying and distribution of a software product. For example, one who has legal possession of one copy of a software program may make an unlimited number of copies and then illegally profit from distribution of those copies. Another example is when an unauthorized person operates a particular program for which the person does not have permission, that is, illegal access. Software misuse is becoming a major concern to the computer industry due to the millions of dollars lost each year. The industry has tried many methods and systems of prevention, a few of which follow.

Making the distribution media uncopyable is a popular method for the personal computer industry. This is done by using a non-standard format for the floppy disk which then prevents the standard copying utilities from being able to make a copy. This method has had very little success due to disk copy routines that assume no predefined disk structure. Examples of these are nibble copiers.

Another method requires a hardware module that must be attached to the computer. The presence of the module must be verified by the protected program. In this method the distribution media, such as a disk or tape, is usually copyable but it is assumed that the hardware module is not. In some cases the module is nothing more than a few ohmic resistors whose SECRET value is read and verified by the program. In other systems the module is a READ ONLY MEMORY (ROM) whose presence is verified. For these systems there are two approaches which circumvent them. One is to copy the hardware module, a process which is fairly easy for a resistor or a ROM. The second is to disable the routine within the program that verifies their presence.

In a recent method of making uncopyable disks, the sector of the disk is written with a decreasing write current and because of this the sector tends to read differently each time read. The program on the disk expects this instability for that sector, and if it does not find this to be so the program halts. If the disk is copied the unstable sector will be stable on the copy. This system is also easy to circumvent in that it is a simple modification to a disk drive to allow it to write out an unstable sector.

All of these methods and systems rely on secrecy for protection: how the disk is coded; what sector was written out in an unstable fashion; what is the value of the resistor; what is in the ROM.

Unauthorized access to data is a large problem for the data processing community and the military. Unauthorized access can take many forms, from the casual looking at data on a terminal connected to the computer to the theft of some sort of storage medium, disk, tape, floppy, etc., with subsequent use of the data on another computer.

There have been many methods and systems posed for the solution of this problem. A few are:

(1) The use of Passwords for gaining access to the system.
(2) The use of additional Passwords to gain assess to a particular file or data set.
(3) The use of limited access to the computer facility or its terminals.
(4) In realizing that data in a computer system can be accessed in some cases without having the correct passwords, the method of file encryption has been used. In this method the unencrypted file is fed into an encryptor along with a suitable encryption key and an encryptor along with a suitable encryption key and an encrypted file emerges from the encryptor. The encryptor may be implemented in software or hardware. Integrated circuit chips for for encryption according to the Department of Defense approved data encryption standard (DES) are widely available. For the data to be usable it is necessary to have the decryption key as well as the encrypted file.

While these methods deter an outsider from stealing data from the computer system, they in no way prevent a trusted user of the system from taking a floppy disk, or its equivalent, and presenting the disk containing the data along with, if necessary, the decryption key to unauthorized persons.

DISCLOSURE OF THE INVENTION

Unauthorized copying of or access to software or data is precluded by encrypting the information such that a key word sequence must be presented to an electronic decryptor to produce useable software or data. An output key used by the decryptor is generated in key generator hardware in response to an input key, thus typing access to the information to access to a hardware module. By generating the output key according to some inaccessible algorithm stored with the module, the number of possible inputs to the key generator is so large that the generator cannot be duplicated by observing its response to all inputs.

Individual words of an output key word sequence can be generated as a function of a plurality of words of the input key word sequence. This results in an index of the key generator to valid output keys which is a function of the total number of words in the input key word sequence.

The key generator may be a programmable array logic chip, but preferably, the key generator comprises a single chip microprocessor. The microprocessor may be programmed as a finite state machine which, in each of a plurality of states, responds to one of a plurality of predetermined input words to change to another of the plurality of states. Simultaneously with the change of states, the microprocessor provides a corresponding output word of the output key sequence. A plurality of repeatable output key word sequences are generated only with predetermined input key word sequences. Each word of a repeatable output sequence is dependent on the present state of the microprocessor and on an input word to the microprocessor which is acceptable at that state.

Preferably, the key generator outputs pseudorandom data until reset by some predetermined initialization input code. When other than one of the repeatable output sequences is generated, the key generator assumes a pseudorandom state to provide misleading outputs. By providing pseudorandom delays in the key generator, operation of that generator is further camouflaged.

In order to avoid the possibility of the use of a hardware logic analyzer on the hardware key generator to find pair input/output keys during operation of the system, the key sequences are surrounded with pseudorandom information. Further, the keys may be further encrypted based on a variable system parameter prior to transfer to and from the key generator hardware.

In order that the decrypted software cannot be readily taken from the operating computer system after a key had been generated, the encrypted software instructions may include multiple loaded segments such as overlayed routines which are independently encrypted. Further, the decryption software may cause prompt erasing of previous instructions which are no longer required by the routine. Input keys other than the first can themselves be encrypted. The decryption routing may look to a separate subroutine to access the key generator to camouflage the source of a key request.

In one application of the present invention, software which is to be distributed is encrypted using an output key from an associated hardware key generator. The software medium, which has the encrypted software recorded thereon along with a decryption software routine and an input key word sequence is distributed with an associated key generator which is required for decryption of the software instructions. When the software is operated, the key generator module must be connected to the computer system as, for example, through an input/output port. The computer applies the recorded input key to the key generator to obtain an output key. The output key is used with the recorded decryption software to decrypt the recorded application software.

In one application of the invention, a hardware key generator may be permanently fixed in a computer system and the system may further include means for both encripting and decripting software or data. Prior to transmitting information from the system, as to a storage unit, the information is encrypted using the system encryptor and a key generated by the key generator. The encrypted information is not usable without the key generator module in the system. Preferably the encryptor is positioned between the CPU bus and each input/output controller.

By providing identical keys to communicating systems, a secure network can be obtained. A new key can be used with each block of data and the output key used in decryption can be qenerated at each terminal by a key generator based on an input key transmitted with the previous block of encrypted data. Preferably, the key generator provides the encryptor with the key pair for encryption and transmission. Alternatively, a table of input keys may be stored in each system with only the output keys generated by the key generator.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1A:
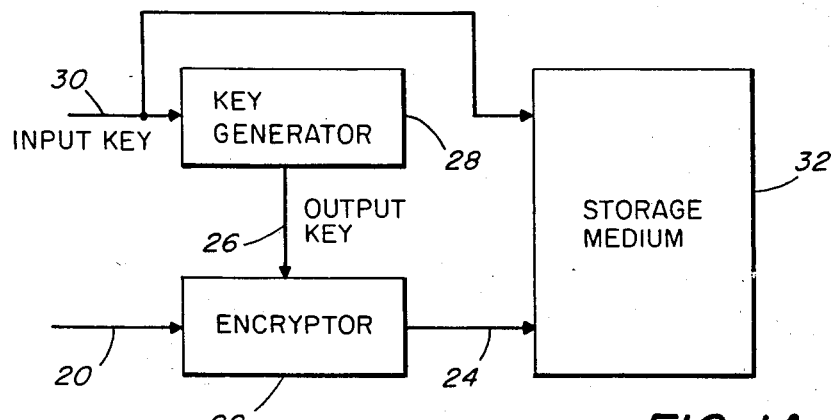
FIGS. 1A and 1B respectively illustrate encryption and decryption of digitally encoded information in accordance with the present invention.
Figure 1B:
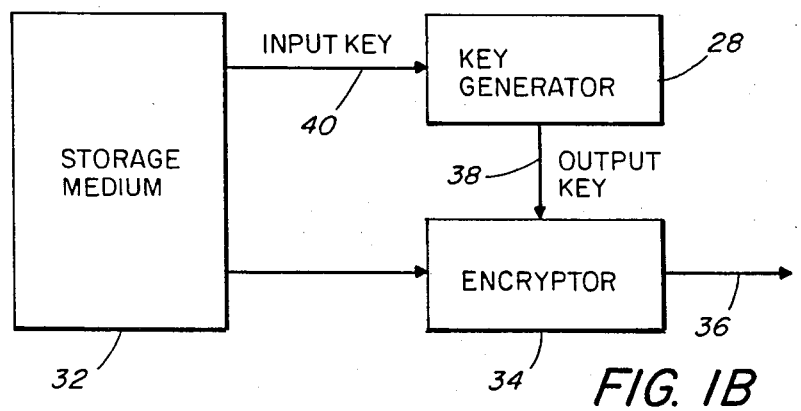

A feature of the present invention is that the digitally encoded information is encrypted prior to storage. The information is then not useable until decrypted. A typical encryption scheme is illustrated in FIG. 1A. Machine readable data is applied from line 20 to an encryptor 22. The encryptor follows some algorithm, which may or may not be generally known, to generate encrypted data on line 24. The encryption is made secret by the use of a secret sequence of digital words on line 26 which serve as a key. In accordance with the present invention, the secrecy of the key utilized for a particular encryption is guaranteed by the use of a key generator 28 which provides the key on line 26 from an input key on line 30. For some particular sequence of words on line 30, the key generator 28 generates another sequence of words which is utilized by the encryptor 22. The input key sequence from line 30 is stored with the encrypted data on a storage medium 32.

In order to utilize the information stored on the storage medium 32, the encrypted data must be applied to a decryptor 32 which compliments the encryptor 22. By processing the algorithm which compliments the algorithm in the encryptor 22, the decryptor 34 can generate useable code on line 36. However, to make the decryption, the decryptor 34 requires the same output key word sequence on line 38 which was used during the encryption. To that end, the same key generator 28 generates an output key from the input key received on line 40 from the storage medium.

In the encryption scheme, it is of course best to use a secret encryption algorithm. However, when the algorithm is in widespread use, it may be difficult to maintain the algorithm as an absolute secret and it is not generally feasible to generate a new encryption scheme for every application. With the present system, only the particular output key word sequence utilized in the encryption need be held secret. As will be discussed below, that key can be held secret because the key generator 28 is not readily copied, yet the sequences available from key generators can be readily modified.

The cryptographic algorithm can be of any conventional type such as suggested in *Cryptohgraphy and Data Security*, by Dorothy Robling Denning, Addison-Wesley, *Cryptography A Primer*, by Alan G. Konheim, John Wiley & Sons, or *The Art of Computer Programming*, Volume 2, Donald E. Knuth, Addison-Wesley.

It can be seen from the above that access to useable information is limited to access to the key generator. In one application of the invention, a hardware key generator is associated with each floppy disk or other storage medium on which software to be distributed is stored. The hardware module must be connected to the computer system utilizing the software in order to make the software readable. In another application, the encryptor 22, decryptor 34 and key generator 28 are all fixed within a computer system. Software and data can be encrypted by that system so that it can only be utilized in that one system or in another system having an identical key generator.

Although a read only memory (ROM) might be used to generate output keys suitable for use by the encryptor/decryptor in response to each word of a sequence of input keys, a ROM can be readily copied by simply testing the output of the ROM with every possible input. In accordance with the present invention, a key generator is provided which has such an extremely large index of possible input/output combinations that it cannot be deciphered in that manner. Although a sequence of words can be presented to a ROM, the ROM processes one word at a time. The total number of combinations of inputs to the ROM is thus $2^n$ where n is the number of bits in a word. In accordance with the present system, each word of the output sequence may be a function of not only the word input at that time but of other words within the sequence. In such a system, the total number of combinations of inputs is $2^{nl}$ where n is the number of bits in a word processed by the key generator and l is the number of words in an input key sequence.

To that end, the key generator must do more than merely output a particular stored word with the input of a particular word. Rather, the key generator must process the incoming key according to an algorithm; that is the incoming key must be logically processed with the final output dependent on multiple decisions.

Figure 2:
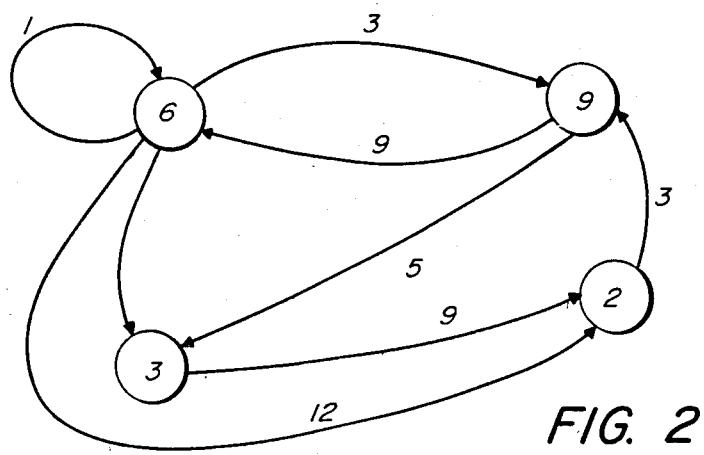
FIG. 2 is a simplified schematic illustration of a possible finite state machine which may serve as the key generator in the systems of FIGS. 1A and 1B.

FIG. 2 illustrates a finite state machine which, in response to an input sequence of words, provides an output sequence of words each of which is a function of both the present input and the history of inputs in the input sequence. This finite state machine is preferably implemented in a single chip microcomputer such as the Motorola MC6805 family. As an example, the model MC68705P5 contains in a single chip: an eight bit microprocessor, an EPROM of 1804 bytes, a scratch pad ram of 112 bytes, two eight bit input/output ports, a counter timer, and device security such that the EPROM cannot be read directly.

In the finite state machine of FIG. 2, there are four possible outputs, each indicated by a circle around a corresponding output value 6, 9, 3 and 2. There are eight transition terms indicated by directed arrows connecting the circled states. For example, if the state machine is at the state corresponding to the upper left circle it has as its output the value 6. If at this point the input value becomes 3, the state machine goes to the state corresponding to the upper right circle and it has as its new output the value 9. On the other hand, if the input were a 7, its new output value would be 3. If an input value other than 1, 3 or 7 were received, the finite state machine would sense an impropef input and would generate some random output. A repeatable output sequence, which can be utilized in encryption/decryption, is only generated by following a sequence of transitions allowed by the finite state machine.

With the microcomputer with 1804 bytes of EPROM, a state machine of 100 output states and hundreds of transition terms can be readily programmed. To copy the device, it would be necessary to discover all the details of the state machine by exercising the device through its input port and noting the corresponding output. This process would takes billions of inputs which would make it unfeasible.

An illustration of the first ten states of a finite state machine having 146 states and three transition terms per state is illustrated by the following table.

| OUTVAL | IN1 | TO1 | IN2 | TO2 | IN3 | TO3 | state |
|---|---|---|---|---|---|---|---|
| 117, | 72, | 144, | 169, | 101, | 68, | 86, | [ 1] |
| 166, | 47, | 91, | 195, | 1, | 112, | 38, | [ 2] |
| 3, | 217, | 22, | 121, | 122, | 82, | 84, | [ 3] |
| 222, | 25, | 127, | 31, | 115, | 187, | 50, | [ 4] |
| 138, | 196, | 110, | 6, | 26, | 126, | 94, | [ 5] |
| 90, | 171, | 13, | 131, | 136, | 112, | 45, | [ 6] |
| 161, | 162, | 43, | 232, | 56, | 98, | 125, | [ 7] |
| 179, | 124, | 56, | 137, | 52, | 40, | 130, | [ 8] |
| 226, | 11, | 112, | 183, | 27, | 148, | 93, | [ 9] |
| 129, | 35, | 104, | 199, | 87, | 122, | 2, | [ 10] |

It can be seen that at stage 1, which may be the initial state of the system responsive to some predetermined initialization code, the output value is 117. The three acceptable inputs at this state are 72, 169 and 68. If any of those inputs are received, the machine steps to state 144, 101, or 86, respectively, and continues from that state with the next transition term. If anything other than a 72, 169 or 68 were received at the input, the microprocessor would simply generate a random number to camouflage the fact that a repeatable transition term had not been entered.

The output of the device at any point of the output sequence is a function of not only its immediate input but of its state, which is in turn dependent on the history of inputs since initialization of the system. With a given table, the number of words in each of the input and output sequences, and thus the number of transistions in a sequence, can be set at any arbitrary length. With a 20 word input sequence and a corresponding 20 word output sequence the number of possible inputs is extremely large. Even based on a small table of states and transitions, there are infinitely many pairs of input/output key sequences which can be generated by the particular device, because the input key can be of any arbitrary length.

Until initialized, the system may be held in a pseudorandom state such that the output is independent of the input. Before the system follows any path between states, it must first be reset by some predetermined reset code which may itself be considered a part of an input key. To further disguise the operation of the device, the device output can be delayed a random amount of time.

As previously noted, an application of the present invention is in the distribution of software on floppy disks and the like. An example of use of a disk encrypted according to the present invention is illustrated in FIG.

3. The computer system which is to utilize the software is conventional. It includes a CPU 50 which communicates through a bus 52 with an internal memory 54 and with a disk storage unit 56. A disk 58 having software encrypted thereon is read by the storage unit 56. The system also may include an input/output port such as port 60. In accordance with the present invention, the key generator 28, which is preferably a single chip microprocessor operating as a finite state machine, is placed in communication with the CPU 50 as through the input/output port 60. Alternatively, the key generator might be connected internally within the system.

At least an initial portion of the disk 58 is in a code readable by the CPU 50. Also in readable code is an initial input key word sequence. Under control of the software on disk 58, the CPU takes the input key sequence and applies it through the I/O port 60 to the key generator to obtain an output key sequence. That output key sequence is then used by the CPU, still under control of the software on disk 58, to decrypt an encrypted segment of software on the disk 58. That decrypted software can then be handled by the CPU. Preferably, the entire disk is encrypted in segments each of which must be decrypted using a key obtained through the key generator 28. Each input key other than the first may be obtained from a previously encrypted segment of the disk. In fact, decryption of segments of the software may be repeated many times before the program itself is decrypted.

If the entire set of software on the disk 58 were decrypted and stored in a memory 54 at any one time, one might improperly obtain a copy of the software by then reading the decrypted program from the memory 54. To avoid such improper copying, multiple loaded segments such as overlay routines are used. Thus, one overlay routine is erased from the memory 54 before the next overlay routine is decrypted. Further, as part of a decryption routine, previous unnecessary routines may be erased. In addition, tamper routines can be utilized to prevent unauthorized modification of the software which would enable one to gain access to the decrypted codes.

The system might also be considered vulnerable to monitorrng of the inputs to and outputs from the key generator 28 to observe the particular output key sequences generated during operation of the software. To make the sequences received at the inputs and outputs of the key generator 28 unuseable other than to the CPU 50 operated under control of the program of disk 58, input key sequences may be surrounded by random information throughout operation of the software. Further, the key sequences being transferred to the generator may themselves be encrypted and then be decrypted by a routine in the key generator. The output key sequence would then be encrypted by the key generator before transmission to the CPU. The encryption will be such that each instance of a given key pair will appear differently. Such an encryption/decryption scheme may be readily based on a seemingly random system parameter such as the system clock.

Figure 3:
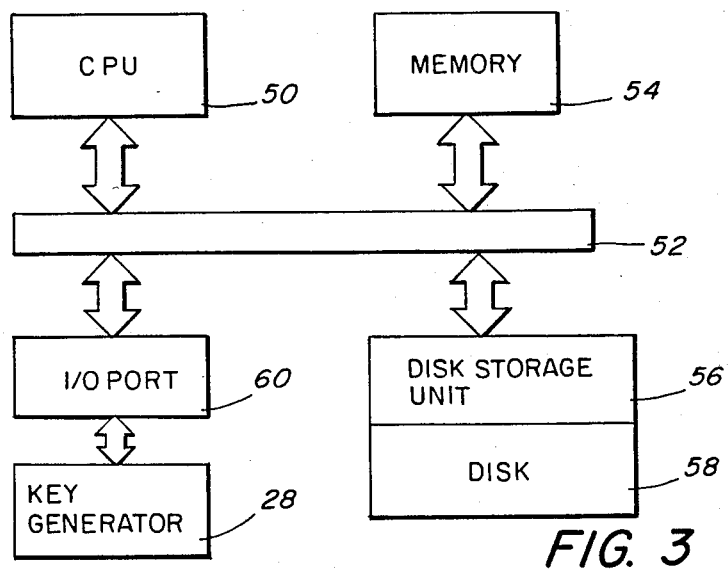
FIG. 3 illustrates a system utilizing a software package embodying the present invention.
Figure 4:
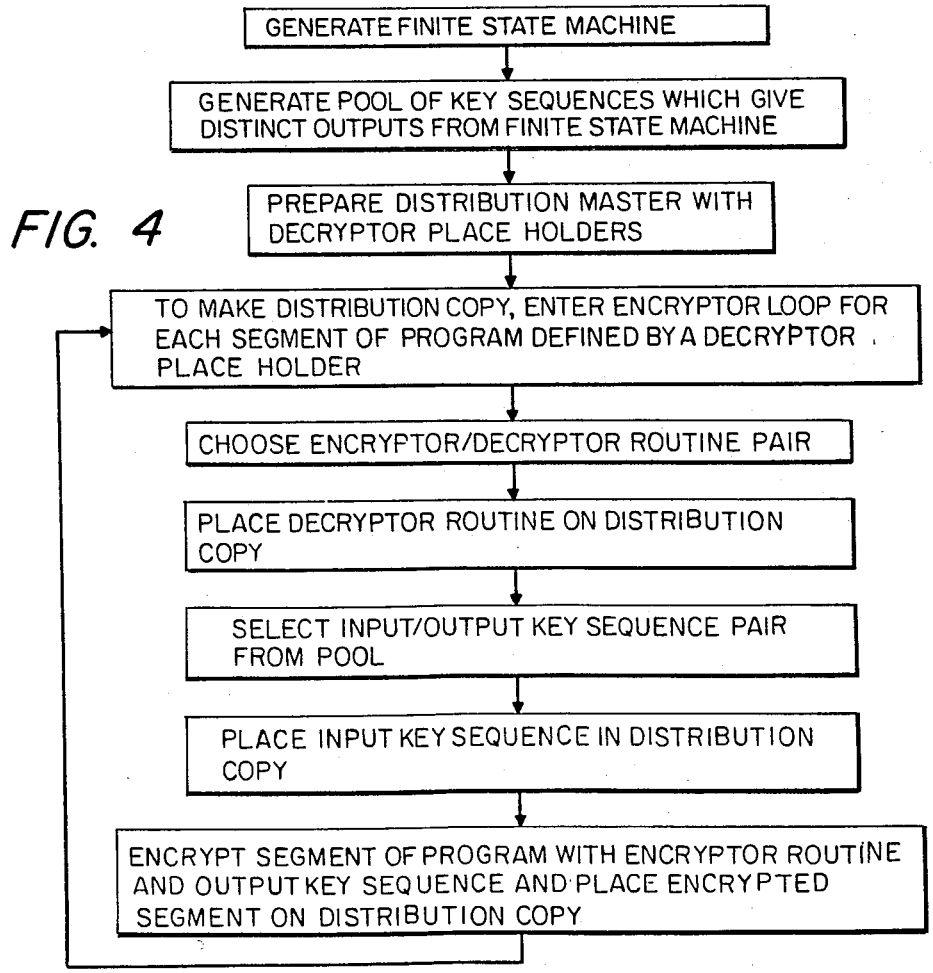
FIG. 4 is a block diagram of a method of encripting data on a software medium in accordance with the present invention.

A block diagram illustrating the production of distribution copies of software such as the floppy disk 58 of FIG. 3 is illustrated in FIG. 4. One or more finite state machines are designed to include software routines which step the device through a number of states as illustrated by the table. For each state machine, a pool of possible input/output sequences is generated. A distribution master of software which is to be encrypted and distributed is prepared and that software includes "decryptor" place holders within the software instructions. Those place holders indicate where a segment of data is to be encrypted and also save space in the instructions for decryption routines.

For each segment of instructions which is to be encrypted by a particular encryption routine and key sequence, a loop which makes up the remainder of the process is entered. An encryption/decryption routine pair is selected and the decryptor routine of that pair is inserted at the decryptor place holder in the distribution copy. Further, an input/output key sequence pair is selected and the input key sequence is placed on the distribution copy. Finally, using the selected encryptor and selected output key sequence, the designated segment of the software is encrypted and that encrypted program is included on the distribution copy. Many individual segments may be encrypted using the same or different encryption routines and different key sequences available from the same key generator. The distribution copy is then sold to a customer or otherwise distributed along with the finite state machine which was selected for that software package.

Figure 5:
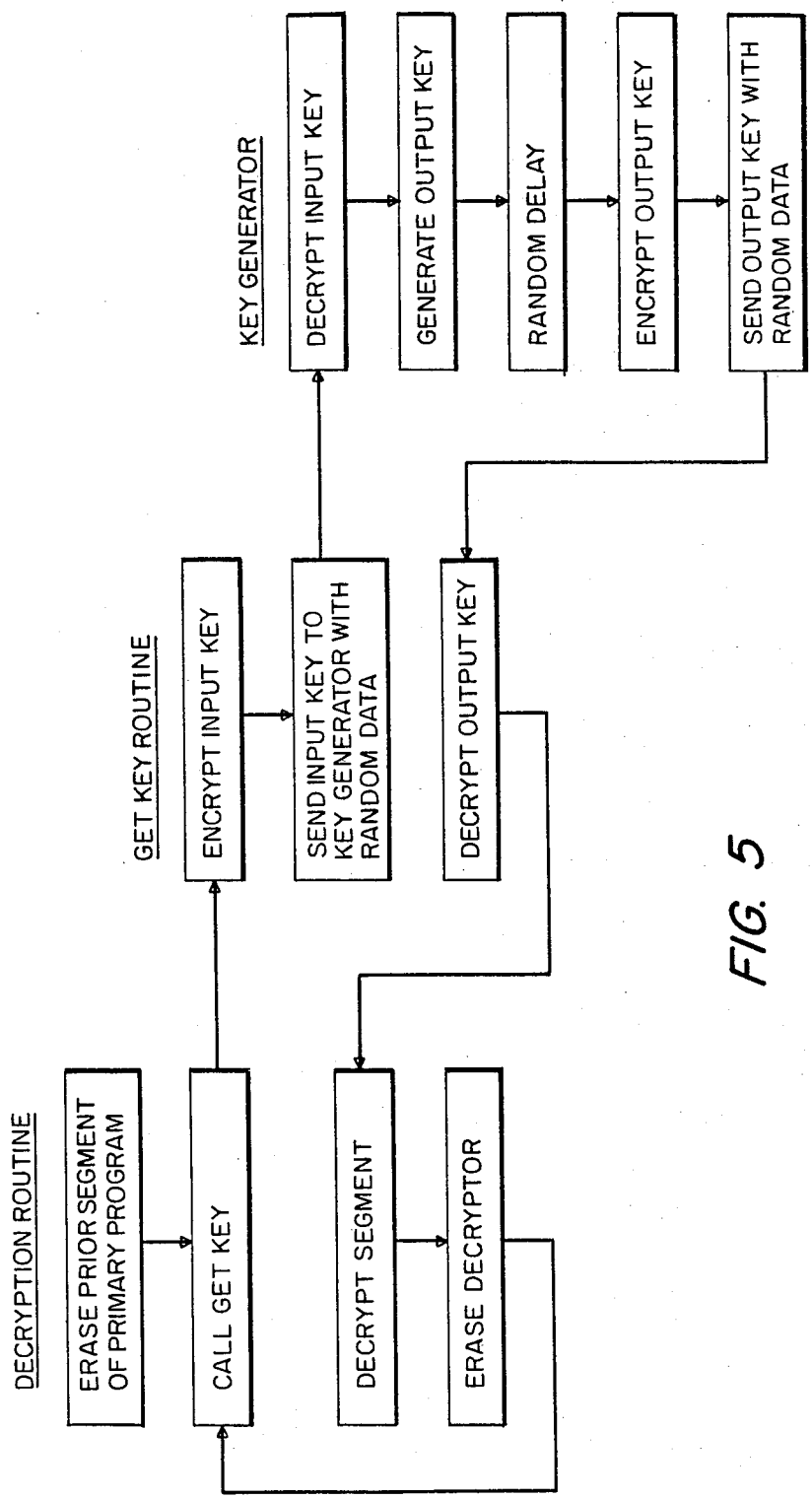
FIG. 5 is a block diagram of the decryptor routine in a system embodying the present invention.

An example decryption routine which might be run by the system of FIG. 3 is illustrated by the block diagram of FIG. 5. In this example, the decryption routine initially erases a prior segment of the primary program to make reading of the program directly from memory 54 difficult. The software then enters a GET KEY routine. Because all decryption routines within the system use a common GET KEY routine, the source of a key request is camouflaged. The GET KEY routine converts input key sequences to output key sequences through the key generator. Because several keys may be required to complete decryption of just the decryption routine, the decryption routine may be a loop.

In the GET KEY routine, an input key sequence may be encrypted, as by using the system clock in an algorithm, and the encrypted input key sequence is forwarded to the finite state machine mixed with random data. The finite state machine decrypts the input key, generates an output key, adds a random delay and encrypts the output key. In the get key routine that output key is then decrypted, and it is utilized in further decryption of the software. Once the next encrypted segment of the application software stored on the disk is decrypted, the decryptor itself is promptly erased.

When applied to the distribution of software, the present invention presently takes the form of software encrypted and stored on a storage medium along with decryption software and input key sequences and is distributed with a corresponding key generator hardware module. In a further application of the invention illustrated in FIG. 6, both an encryptor/decryptor module 70 and the key generator 28 are fixed internally within a computer system to the sytem bus. For speed of operation, the encryptor/decryptor is preferably a hardware module but it could be included in the system software. The key generator 28 is a hardware module so that it cannot be copied. With the system of FIG. 6, the system user can encrypt software instructions or data, using a key sequence available from the key generator 28, prior to sending the software or data to storage as on the disk storage unit 56. The encryptor might be made under control of the CPU operating system. Thus, even though a user of the system could copy the stored code and transfer it to another system, that code would be unuseable without knowledge of the encryptor/decryptor and, more importantly, without the key generator 28.

Figure 7:
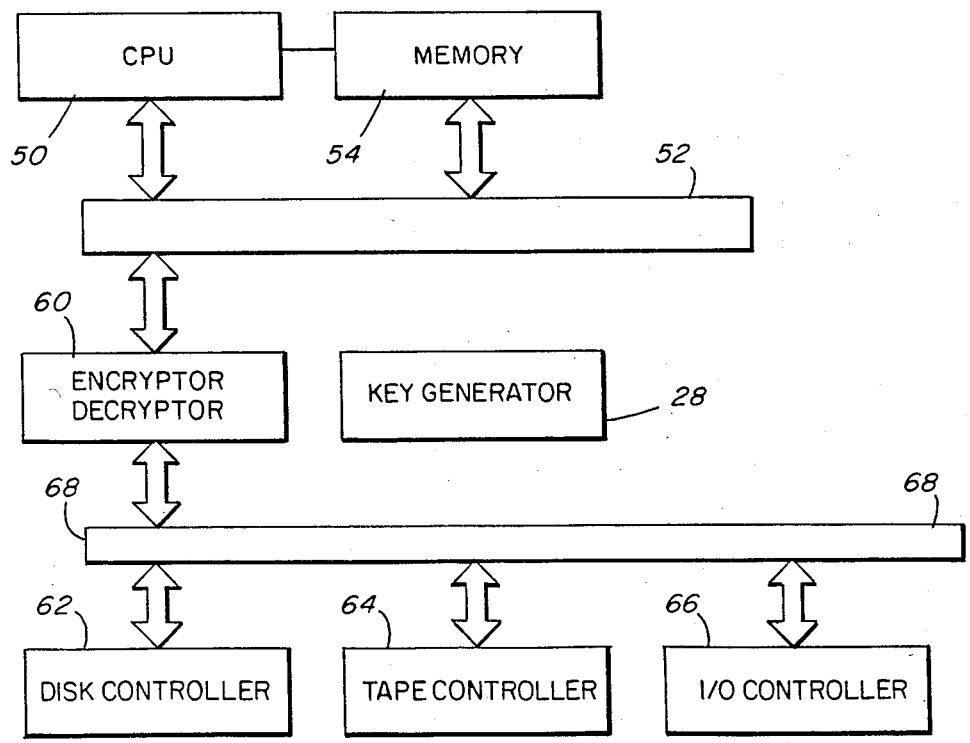
FIG. 7 is a block diagram of yet another embodiment of the invention.

A more secure arrangement of the encryptor/decryptor module is shown in FIG. 7. In this system, the encryptor/decryptor 60 is physically located between the system bus 52 and various input/output controllers including a disk controller 62, a tape drive 64 and an input/output port controller 66. In the system shown, each input/output controller is connected to a controller bus 68 and the encryptor/decryptor 60 is positioned between that bus and the system bus 52. Alternatively, a separate encryptor/decryptor could be positioned between the system bus 52 and each of the input/output controllers.

As in all prior embodiments, the encryptor/decryptor relies on a key generator 28 to provide output keys for encryption or decryption and only input keys are transmitted to an output device with the encrypted information. In one form of the invention, both the encryptor/decryptor 60 and the key generator 28 are included within a single chip microprocessor. However, for very high speed systems, it is preferred that the key generator 28 be linked with a hardware encryptor/decryptor such as the Motorola MC6859 or the Western Digital WD2001/WD2002 which perform the DES standard.

The encryptor/decryptor 60 requires both output keys for the encryption and decryption and input keys for transmission with the encrypted data. The latter may be obtained from tables stored in memory 54. However, in a preferred system the key generator 28 provides both keys of the input/output key pair. By use of suitable algorithms, the state machine previously described for example can be used to generate a very large number of such key pairs.

Figure 6:
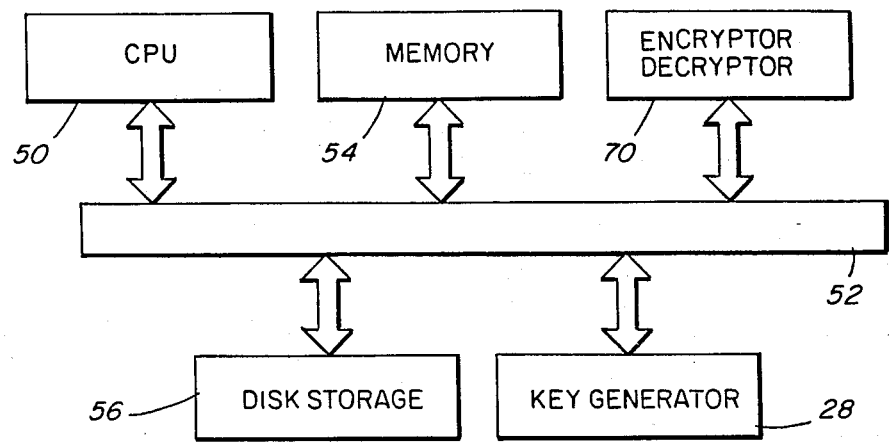
FIG. 6 is a block diagram of an alternative application of the present invention.
Figure 8:
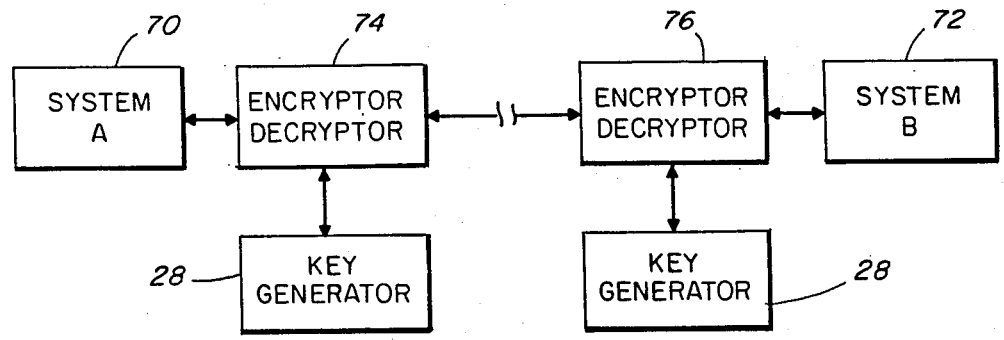
FIG. 8 is a block diagram of a communications network embodying this invention.
Figure 9:
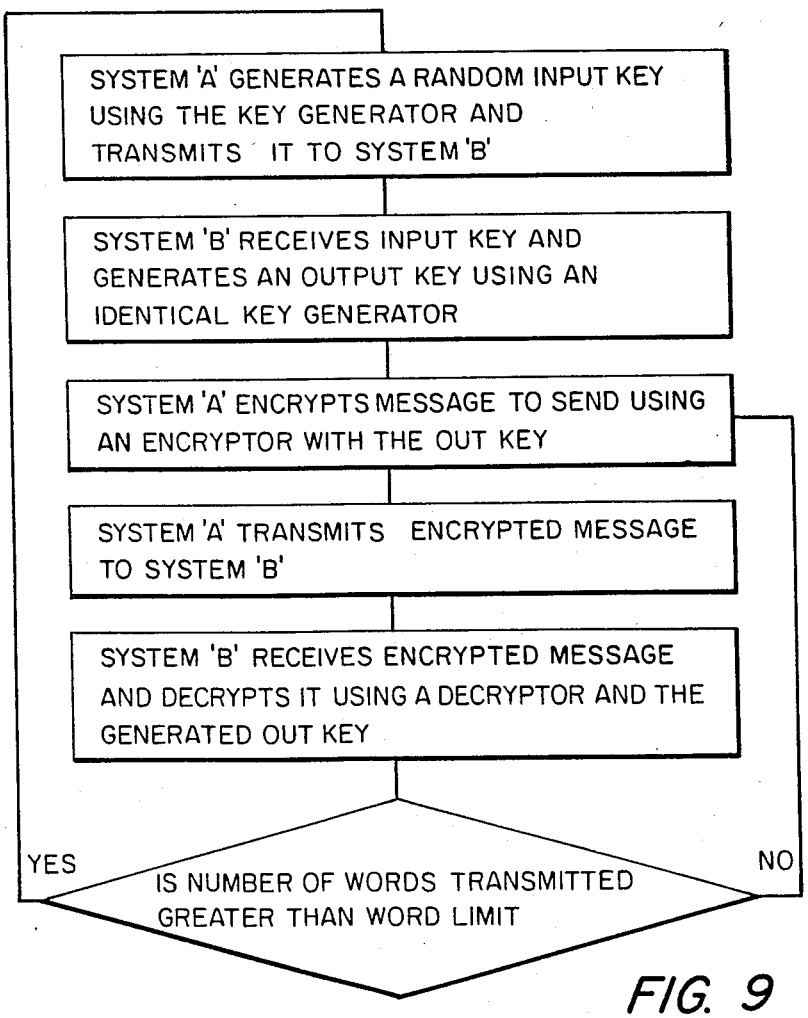
FIG. 9 is a procedural block diagram of the system of FIG. 8.

Either of the systems of FIGS. 6 and 7 can be utilized in a secure network illustrated in FIG. 8. A procedural flow chart for the system is shown in FIG. 9. In this system, one computer system 70 must communicate with another computer system 72. It is typical for two computer systems to communicate through encryptor/decryptor pairs 74, 76 which may for example be based on the DES standard. However, a weak link in such systems is the need for a key known to both systems. If only a limited number of keys are available, the system can be eventually broken. To change keys, new keys must somehow be communicated to each of the systems. In accordance with the present invention, each encryptor/decryptor 74, 76 has access to identical key generators 28. With these key generators, each block of information transmitted between the systems can be encrypted with a distinct key and the corresponding input key can be transmitted over the transmission lines. Thus the encryption key can be changed frequently since the associated input key can be transmitted on the same transmission line. Without the hardware key generator, the actual output key required for decryption is not available. In preferred use of the system, the input key to be used in obtaining an output key for one block of encrypted data is transmitted in a prior block of encrypted data which was encrypted using some other key pair. Thus, to decrypt the transmitted information one would first have to decrypt the input key and then, from that key, determine the proper output key required for decryption. Such is a formidable task. The key generator based on the state machine can generate an extremely large number of key pairs.

Although the system of FIG. 8 is shown with only two linked systems, an entire network may be on a common key generator 28. Further, the system 70, 72 need not be a computer system. Audio-visual information or the like can also be encrypted using this system.

Although a finite state machine is the preferred key generator, other key generators may be used. In general, in order to make a word of an output sequence dependent on more than a single word of the input sequence, the key generator requires data storage and data circuitry on a common chip. The data stored on the chip should not be accessible other than through the processing circuitry.

Another example of a key generator which may be implemented by a single chip microprocessor is one which includes a list of acceptable word sequences. The full sequence must be verified before an output sequence is generated. Once the full sequence is verified, a stored sequence associated with that verified input sequence may be generated. Alternatively, the output sequence might be generated through some algorithm. The important thing is that as far as the potential pirate is concerned, the key generator presents the possibility of $2^{n1}$ different input key sequences, any group of which may be valid. As previously noted, n1 is the product of the number of bits in a word and the number of words.

While the invention has been particulary shown and described with reference to preferred embodiments thereof, it will be understood by those skilled in the art that various changes in form and details may be made therein without departing from the spirit and scope of the invention as defined by the appended claims.

I claim:

1. A system for processing encrypted information, the system comprising:
    key generator hardware for processing an input key associated with the encrypted information according to an alogorithm to generate a unique output key, the decryption key generator comprising a single chip microprocessor programmed as a finite state machine which, in each of a plurality of states, responds to one of a plurality of predetermined input words to change to another of a plurality of states and output a corresponding output key word, a plurality of repeatable output key word sequences being generated only with predetermined input key word sequences with each word of a repeatable output sequence being dependent on the present state of the microprocessor and on an input word to the microprocessor which is acceptable at that state; and
    decryptor means for receiving the encrypted information and a corresponding output key from the key generator hardware and for decrypting the received encrypted information based on the received output key.

2. A processing system as claimed in claim 1 wherein the key generate outputs pseudorandom information until reset by a predetermined input reset code.

3. A processing system as claimed in claim 1 wherein the decryption key generator provides a pseudorandom output when other than an acceptable input key word sequence is received.

4. A processing system as claimed in claim 1 wherein the decryption key generator provides pseudorandom delay to the output of key words.

* * * * *